United States Patent Office 3,629,301
Patented Dec. 21, 1971

---

3,629,301
3,3-DIFLUORO-2-SUBSTITUTED STEROIDS AND THEIR PREPARATION
William C. Ripka, Wilmington, Del., assignor to E. I. du Pont de Nemours and Company, Wilmington, Del.
No Drawing. Filed Oct. 24, 1969, Ser. No. 869,352
Int. Cl. C07c *169/20*
U.S. Cl. 260—397.3          10 Claims

ABSTRACT OF THE DISCLOSURE

New steroids of the formula

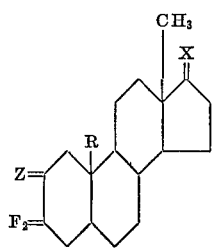

wherein Z is oxygen or

R is hydrogen or methyl; and X is oxygen or

where $R^1$ is hydrogen, methyl or ethynyl, and $R^2$ is hydrogen or an alkanoyl of no more than 8 carbon atoms can be made in two steps from 3-fluoro-$\Delta^2$-steroids. These hormone-active 3,3-difluoro steroids primarily have antiandrogenic activity, although some exhibit androgenic properties.

BACKGROUND OF THE INVENTION

This invention relates to new steroid compounds having two fluorine atoms in the 3-position and a ketone or a hydroxyl in the 2-position. These compounds possess antiandrogenic activity. Some of them also have androgenic properties. Certain steroids having fluorine atoms in C-2, C-3, or C-4 positions were disclosed in U.S. Pats. 3,055,916; 3,257,424; and 3,232,960; respectively. However, neither 3,3-difluoro-2-keto steroids nor 3,3-difluoro-2-hydroxy steroids have been heretofore reported.

SUMMARY

The new compounds of this invention can be represented by the formula:

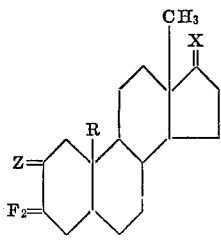

wherein Z is oxygen or one hydroxyl and one hydrogen; R is hydrogen or methyl; and X is oxygen or

where $R^1$ is hydrogen, methyl, or ethynyl, and $R^2$ is hydrogen or an alkanoyl having no more than 8 carbon atoms, such as formyl, acetyl, propionyl, butyryl, valeryl and caproyl.

These compounds are prepared from 3-fluoro-$\Delta^2$-steroids by a reaction with nitrosyl fluoride and subsequent conversion of the 3,3-difluoro-2-nitrimino steroid products to the corresponding 3,3-difluoro-2-keto steroids with alumina containing water, as shown in the reaction scheme below involving the steroid A-ring:

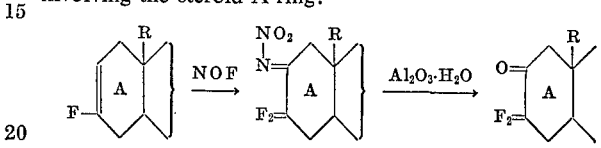

The 2-keto group can be converted to the 2-hydroxy group by conventional techniques, including, for example, reduction with sodium borohydrides.

DETAILED DESCRIPTION OF THE INVENTION

The first step of the reaction sequence, the reaction of a 3-fluoro-$\Delta^2$-steroid with nitrosyl fluoride is carried out in an inert solvent such as methylene chloride, chloroform, carbon tetrachloride, fluorodichloromethane, and ethylene dichloride. Potassium fluoride or sodium fluoride sometimes are added to absorb hydrogen fluoride which is formed. The reaction takes place at moderate temperatures, but a temperature of up to about 100° C. can be used. The preferred temperature range is about −10° to 30° C., where the reaction rates are satisfactory and can be readily controlled. Atmospheric pressure usually is sufficient, although higher pressures may be sometimes required to maintain a sufficient concentration of the reactants at the temperature used.

The nitrosyl fluoride adduct obtained in the first step, the 2-nitrimino-3,3-difluoro steroid, can be determined spectrometrically; but it is unnecessary to isolate and purify the adduct. The crude solution is treated with an alkali bicarbonate or another weak base to remove excess nitrosyl fluoride and/or acidic products formed. The adduct is then contacted with neutral alumina containing 5–15% by weight of water (activity grade III). This is most conveniently done by chromatographic technique, eluting the desired 3,3-difluoro-2-keto steroid from the alumina with an appropriate solvent or solvent combination. The product then is purified by crystallization from usual solvents.

The starting 3-fluoro-$\Delta^2$-steroids can be prepared by a reaction of 3-keto steroids with sulfur tetrafluoride to yield the corresponding 3,3-difluoro steroids, which are then dehydrofluorinated with neutral anhydrous alumina. This latter reaction is conducted essentially as described in U.S. 3,413,321. This sequence is illustrated by the following scheme involving the A ring:

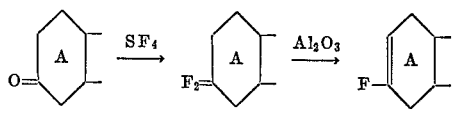

This invention is now illustrated by the following examples of certain preferred embodiments thereof.

EXAMPLE 1

3,3-difluoroandrostan-2-17-dione

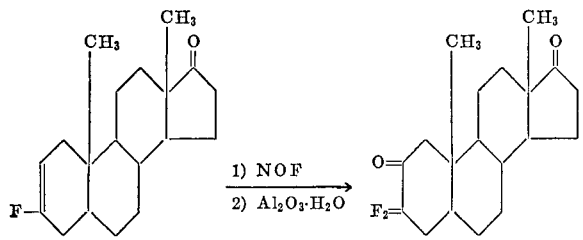

A solution of 1.4 g. of 3-fluoro-2-androstan-17-one in 25 ml. of methylene chloride was contacted with 10 g. of nitrosyl fluoride at 25° for 16 hours. The mixture was poured into water and the methylene chloride layer was separated, washed successively with water, saturated sodium bicarbonate, water and brine. It was dried over $Na_2SO_4$ and concentrated to give crude 3,3-difluoro-2-nitriminoandrostan-17-one, Infrared:

$$\lambda_{max.}^{neat} 6.1\mu \ (C=N), \ 6.4\mu \ (NO_2)$$

The crude nitrimino steroid was chromatographed on 40 g. of alumina of activity III (containing about 6% water) and eluted with hexane:benzene fractions to give 3,3-difluoroandrostan-2,17-dione of which 0.8 g. was recrystallized from acetone-hexane to give long needles, M.P. 163–164.5.

Infrared:

$$\lambda_{max.}^{CHCl_3} 5.75\mu (C-2 \text{ and } C-17 \ C=O)$$

8.50, 8.65 and 8.86 (C—$F_2$), NMR (H) tetramethylsilane as internal standard: H–18 (0.87 p.p.m.), H–19 (0.83 p.p.m.; doublet), H–1 (2.5 p.p.m.; triplet with J=3 c.p.s.); NMR (F–19) with trichlorofluoromethane as internal standard: F–3α and 3β at +5772, 6049, 6446 and +6683 c.p.s.

Analysis.—Calcd. for $C_{19}H_{26}F_2O_2$ (percent): C, 70.34; H, 8.08; F, 11.71. Found (percent): C, 70.72; H, 7.92; F, 11.91.

When ethylene glycol is added to 3,3-difluoroandrostan-2,17-dione in benzene solution and heated in the presence of p-toluenesulfonic acid, the monoketal, 3,3-difluoro-17-ethylenedioxyandrostan-2-one is formed as shown by NMR spectrum. This is a useful compound for further reactions involving the steroid.

EXAMPLE 2

3,3-difluoro-17β-hydroxyandrostan-2-one acetate

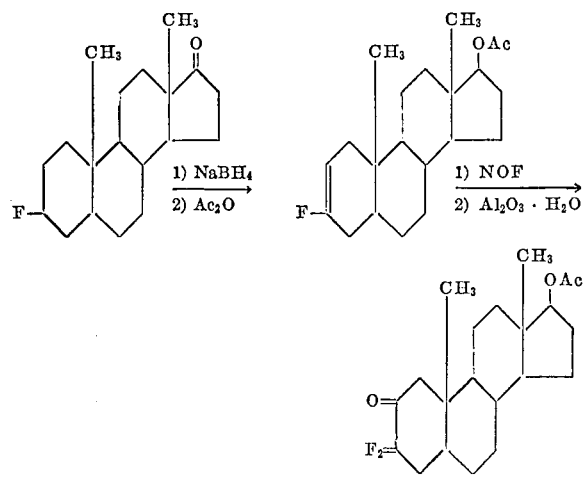

To a solution of 2.5 g. of 3-fluoro-2-androsten-17-one in 50 ml. of methanol and 50 ml. of tetrahydrofuran was added 0.175 g. of sodium borohydride and the mixture was stirred at 25° for 2 hours. The solution was then concentrated under vacuum and water was added. The solid residue was collected and dried to give 2.7 g. of 3-fluoro-17β-hydroxy-2-androstene. This was dissolved in 50 ml. of pyridine and 25 ml. of acetic anhydride and stirred at 25° for 16 hours. The solution was then poured into water. The precipitate was collected, dried and crystallized from acetone-hexane to give 2.6 g. of 3-fluoro-17β-hydroxy-2-androstene 17-acetate. This compound (2.6 g.) was dissolved in 50 ml. of methylene chloride and 1 g. of NOF was added. The reaction mixture was subsequently treated as in Example 1 to give, after chromatography on alumina activity grade III, 0.633 g. of white crystalline 3,3-difluoro-17β-hydroxyandrostan-2-one acetate, M.P. 165–167 (from acetone-hexane).

Infrared;

$$\lambda_{max.}^{Nujol} 5.76 \text{ and } 5.82\mu \text{ (acetate and C-2 C=O)}$$

8.4, 8.5 and 8.7μ (C—F); NMR (H') (CDCl₃); 4.65 p.p.m.; triplet with J about 7 c.p.s. (H–17), 2.50 p.p.m.; triplet with J about 3 c.p.s. (H–1), 2.05 p.p.m. (acetate CH₃), 0.833 and 0.800 p.p.m. (H–19 and H–18).

Analysis.—Calcd. for $C_{21}H_{30}O_3F_2$ (percent): C, 68.44; H, 8.21. Found (percent): C, 68.49; H, 8.09.

EXAMPLE 3

3,3-difluoro-2,17-dihydroxyandrostane 17-acetate

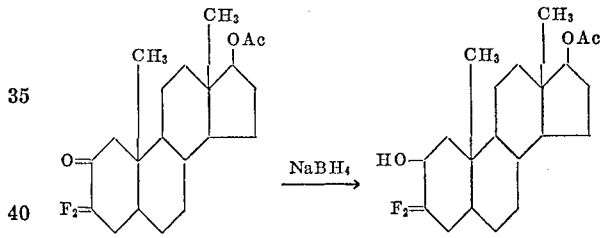

To a cooled solution of 0.2 g. of 3,3-difluoroandrostane-2-one 17-acetate (see Example 2) in 15 ml. of methanol was added 0.023 g. of sodium borohydride. The solution was stirred for 30 minutes and poured into water. The solid was collected and recrystallized in acetone-hexane to give 0.16 g. of crystalline 3,3-difluoro-2β,17β-dihydroxyandrostane 17-acetate, M.P. 158–160°.

Infrared:

$$\lambda_{max.}^{CHCl_3} 2.77 \text{ and } 2.90\mu \text{ (OH)}; 5.78\mu \text{ (C=O)}$$

Analysis.—Calcd. for $C_{21}H_{32}O_3F_2$ (percent): C, 68.07; H, 8.71. Found (percent): C, 68.23; H, 8.61.

When the general procedure of Example 1 is repeated except that 3 - fluoro - 17α - ethynyl - 17β - hydroxy-2-androstene 17-acetate is employed, there results from reaction with nitrosyl fluoride and treatment with the alumina, 3,3 - difluoro - 17α - ethynyl - 17β - hydroxyandrostan-2-one acetate, according to the reaction

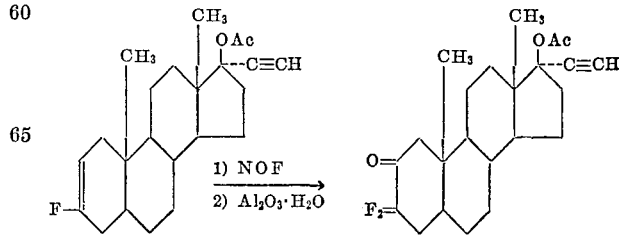

The 3 - fluoro - 17α - ethynyl - 17β - hydroxy - 2 - androstene 17-acetate was prepared as follows:

Androstan-3,17-dione was reacted with sulfur tetrafluoride at 20° to yield 3,3-difluoroandrostan-17-one which was dissolved in xylene and treated with neutral anhydrous alumina of activity I (in the manner described in U.S.

3,413,321) to give 3-fluoro-2-androsten-17-one. The latter (3.3 g.) in 40 ml. of dimethyl sulfoxide was treated with 25 ml. of a 20% suspension of sodium acetylide in xylene and the solution stirred, under nitrogen, at 25° for 30 minutes. It was then poured into ice-water and extracted with methylene chloride. The organic layers were washed well with water, then dried ($Na_2SO_4$) and evaporated. Chromatography of the residue on Florisil and elution with acetone-hexane fractions gave 1.8 g. of 3-fluoro-17α-ethynyl-17β-hydroxy-2-androstene.
Infrared:

$\lambda_{max.}^{Nujol}$ 3.20μ (OH) 3.00μ (C≡CH), 5.89μ (C=C—F)

A solution of 1.8 g. of 3-fluoro-17α-ethynyl-17β-hydroxy-2-androstene, 30 ml. of pyridine and 15 ml. of acetic anhydride was refluxed for 12 hours under nitrogen. It was then cooled, poured into water and extracted with methylene chloride to give a residue, which, chromatographed on Florisil and eluted with acetone-hexane mixtures, gave 2 g. of the white, crystalline acetate.
Infrared:

$\lambda_{max.}^{Nujol}$ 3.00μ (≡C—H, 5.75μ (acetate C=O);

5.85μ (C=C—F)

When 3,3 - difluoro-17α-ethynyl-17β-hydroxyandrostan-2-one 17-acetate is treated with sodium borohydride in tetrahydrofuran, washed, and dried, there is produced 3,3-difluoro-17α-ethynyl-2β,17β - dihydroxyandrostane 17-acetate.

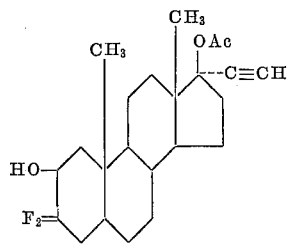

Likewise, when 3-fluoro-17α-methyl-17β-hydroxy-2-androstene 17-acetate in methylene chloride is contacted with nitrosyl fluoride, treated with water and chromatographed on alumina (with 6% water), there results 3,3-difluoro-17α-methyl - 17β - hydroxyandrostan-2-one 17-acetate according to the equation:

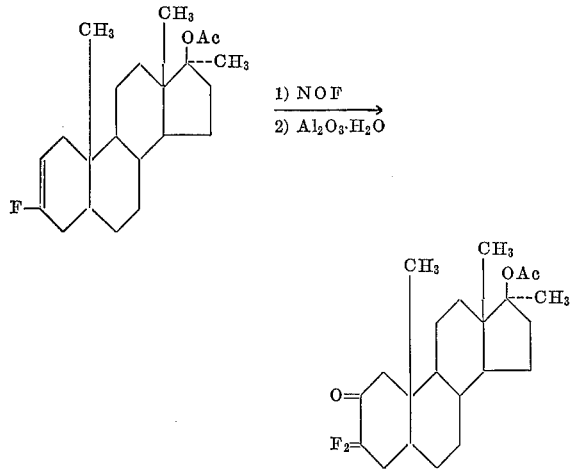

The 3-fluoro-17α-methyl-17β-hydroxy-2-androstene 17-acetate is obtained as follows:
3-fluoro-2-androsten-17-one is prepared as described above. This compound in anhydrous ether, under nitrogen, is treated dropwise with a 3 M ethereal solution of methyl magnesium bromide stirred at 25° under nitrogen for 2 hours, then poured into ice-water. This mixture is extracted with ethyl acetate. The organic extracts are washed with water and brine, dried ($Na_2SO_4$) and concentrated. Crystallization from acetone-hexane gives 3-fluoro-17α-methyl-17β-hydroxy-2-androstene. A solution of 2.0 g. of the latter, 30 ml. of pyridine and 15 ml. of pyridine and 15 ml. of acetate anhydride is refluxed for 12 hours. It is cooled, poured into water and extracted with methylene chloride to give a residue which, chromatographed on Florisil and eluted with acetone-hexane mixtures, gives 3-fluoro-17α-methyl-17β-hydroxy-2-androstene 17-acetate.

When a solution of 3-fluoro-2-estren-17-one in methylene chloride is treated with nitrosyl fluoride, then poured into water, and extracted with methylene chloride, there is produced 3,3-difluoro-2-nitriminoestran-17-one; infrared absorption at 6.1 (C=N) and 6.4μ ($NO_2$). The crude material is chromatographed directly on alumina activity grade III and eluted with benzene:hexane mixtures and finally benzene to obtain crystalline 3,3-difluoroestran-2,17-dione, as shown by the equation

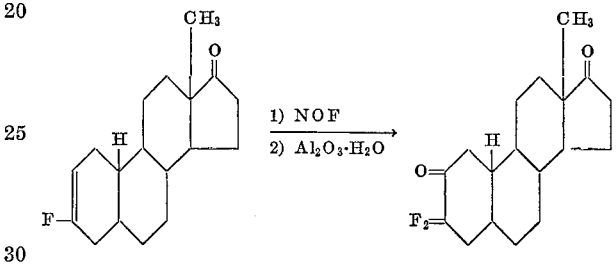

The 3-fluoro-2-estren-17-one can be obtained by reaction of sulfur tetrafluoride with estran-3,17-dione, followed by treatment of the 3,3-difluoroestran-17-one with anhydrous alumina. 3-fluoro-2-estren-17-one when contacted with sodium borohydride and acetic anhydride yields 3-fluoro-2-estren-17-ol acetate, from which 3,3-difluoro-2-nitriminoestren-17-ol acetate and subsequently 3,3-difluoroestren-2-one 17-ol acetate are produced according to the procedure of Example 1. Hydrolysis of the latter compound gives the corresponding 3,3-difluoroestran-2-one.

The above illustrate preparation of 17-acetate derivatives with acetic anhydride. Butyric or propionic anhydrides give the corresponding butyrates and propionates. With higher anhydrides, e.g., caproic, enanthic or caprylic acid anhydrides, a catalytic amount of p-toluenesulfonic acid facilitates formation of the corresponding esters.

The new compounds of this invention have hormonal activity. Those having a 17-keto group have antiandrogen activity, i.e., they block the androgenic or virilizing action of testosterone. Those having a 17-alkanoyloxy group have androgenic activity. The compounds having a 17-hydroxy or alkanoyloxy substituent and a methyl or ethynyl group, exhibit antiestrogenic activity useful for fertility control.

The androgen activity can be shown by the chicken-comb assay. Day-old male white Leghorn chicks are used. The test material (in 0.05 ml. of absolute ethanol) is applied to the comb once daily for 7 consecutive days, with autopsy on day 8. Observation of the comb ratios of the two sets of chicks shows the effectiveness of the compounds as shown in Table I.

TABLE I

| Material | Total dose (mg.) | No. of chicks | Mean comb ratio ± standard error |
|---|---|---|---|
| Control | 0 | 10 | 0.41±0.02 |
| Testosterone | 3 | 10 | 0.45±0.03 |
|  | 9 | 9 | 0.72±0.03 |
| Compound of Example 2 | 50 | 10 | 0.46±0.04 |
|  | 500 | 10 | 0.55±0.02 |
| Compound of Example 3 | 50 | 10 | 0.51±0.03 |
|  | 500 | 10 | 0.58±0.07 |

It can be seen from the above data that compounds of Examples 2 and 3 have a small but definite androgenic activity.

The antiandrogen activity of the 3,3-difluoro-2,17-diketone compound of Example 1 was demonstrated by inhibition of the testosterone-induced seminal vesicle growth in a manner similar to that by progesterone, which is accepted as an antiandrogenic agent and useful for treatment of prostatic diseases. This can be demonstrated by administering the compound to male Swiss mice castrated at age 21–23 days. Beginning on the day after castration, testosterone (in 0.1 ml. sesame oil), subcutaneous injection (0.8 mg. total dose) was administered once daily for 7 consecutive days. At the same time, the compound of Example 1 was administered once daily for 7 days (0.2 s.c. injection). The seminal vesicle weights were obtained at autopsy on the day after the last injection. Table II shows the test results.

TABLE II

| Material | Total dose (mg.) | Testosterone total dose (mg.) | No. of mice | Seminal vesicle weight [1] |
|---|---|---|---|---|
| None | 0 | 0 | 9 | 0.33±0.17 |
| None | 0 | 0.8 | 7 | 0.85±0.09 |
| Progesterone | 10 | 0.8 | 9 | 0.69±0.06 |
| Compound of Example 1 | 8 | 0.8 | 8 | 0.61±0.04 |

[1] Percent standard error.

It is apparent from the above table that the antiandrogen activity of the compound of Example 1 is at least as high as that of progesterone.

The embodiments of the invention in which an exclusive property or privilege is claimed are defined as follows:

1. A compound of the formula

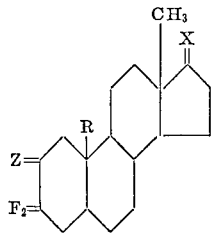

wherein

R is selected from hydrogen and methyl;
X is oxygen or one $R^1$ radical and one $OR^2$ group, $R^1$ being a member of the group hydrogen, methyl, and ethynyl and $R^2$ being a member of the group hydrogen and $C_1$–$C_8$ alkanoyl; and
Z is oxygen or one hydrogen and one hydroxyl.

2. 3,3-difluoroandrostan-2,17-dione, the compound of claim 1 in which R is methyl and each of X and Z is an oxygen atom.

3. 3,3-difluoro-17β-hydroxyandrostan-2-one acetate, the compound of claim 1 in which R is methyl; X is one hydrogen and one acetoxy group, and Z is oxygen.

4. 3,3-difluoro - 2,17 - dihydroxyandrostane 17-acetate, the compound of claim 1 in which R is methyl; X is one hydrogen and one acetoxy group and Z is one hydrogen and one hydroxyl.

5. 3,3-difluoro - 17α - ethynyl-17β-hydroxyandrostan-2-one acetate, the compound of claim 1 in which R is methyl; X is one acetoxy group and one ethynyl; and Z is oxygen.

6. 3,3-difluoro - 17α - ethynyl-2β,17β-dihydroxyandrostane 17-acetate, the compound of claim 1 in which R is methyl, X is one ethynyl and one acetoxy group; and Z is one hydrogen and one hydroxyl.

7. 3,3-difluoro - 17α - methyl-17β-hydroxyandrostan-2-one 17-acetate, the compound of claim 1 in which R is methyl; X is one methyl and one acetoxy group; and Z is oxygen.

8. 3,3-difluoroestran-2,17-dione, the compound of claim 1 in which R is hydrogen; X and Z each is an oxygen atom.

9. 3,3-difluoroestran-2-one-17-ol acetate, the compound of claim 1 in which R is hydrogen; X is one hydrogen and one acetoxy group and Z is oxygen.

10. 3,3-difluoroestran - 2 - one-17-ol, the compound of claim 1 in which R is hydrogen; X is one hydrogen and one hydroxyl; and Z is oxygen.

References Cited

Wellman et al., Journ. Amer. Chem. Soc., vol. 86, February 1964, pp. 492–8.

LEWIS GOTTS, Primary Examiner

E. G. LOVE, Assistant Examiner

U.S. Cl. X.R.

260—239.55 C, 397.4, 397.5; 424—238, 242, 243